Sept. 29, 1964   N. K. GLADIEUX ETAL   3,150,948
METHOD AND APPARATUS FOR SUPPORTING SHEET MATERIAL
Filed March 7, 1960   3 Sheets-Sheet 1

INVENTORS
Norman K. Gladieux,
BY George F. Ritter, Jr. and
Alfred E. Badger
Nobbe & Swope
ATTORNEYS Sept. 29, 1964   N. K. GLADIEUX ETAL   3,150,948
METHOD AND APPARATUS FOR SUPPORTING SHEET MATERIAL
Filed March 7, 1960   3 Sheets-Sheet 2

INVENTORS
Norman K. Gladieux,
BY George F. Ritter, Jr. and
Alfred E. Badger
Nobbe & Swope
ATTORNEYS

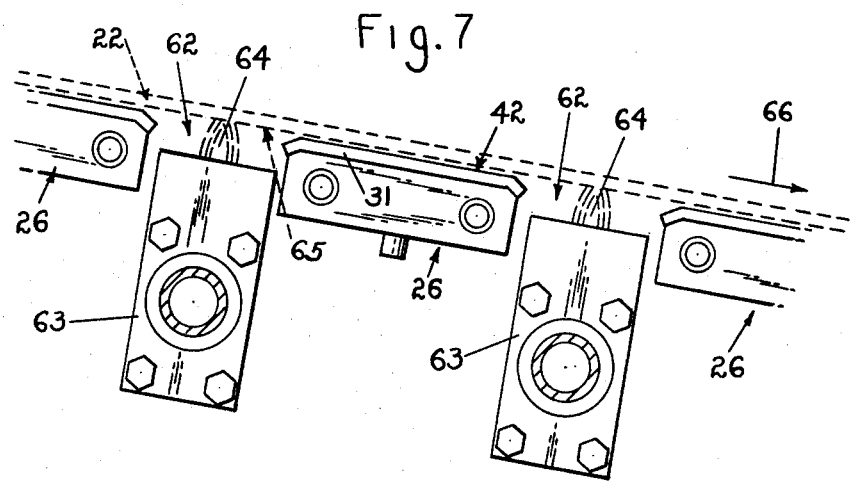
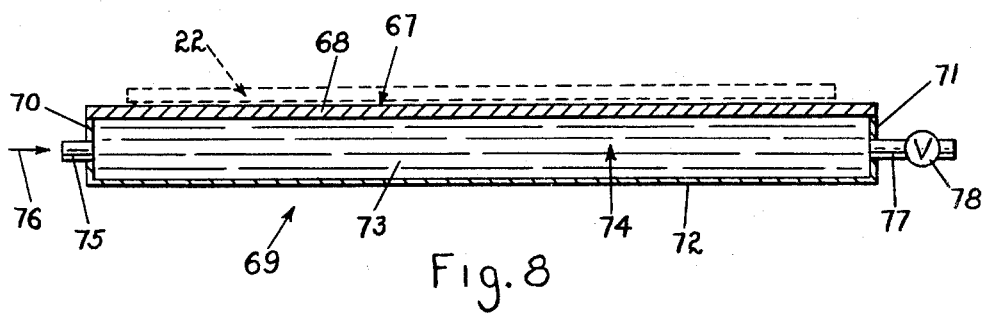

United States Patent Office 3,150,948
Patented Sept. 29, 1964

3,150,948
METHOD AND APPARATUS FOR SUPPORTING SHEET MATERIAL
Norman K. Gladieux and George F. Ritter, Jr., Toledo, and Alfred E. Badger, Maumee, Ohio, assignors to Libbey-Owens-Ford Glass Company, Toledo, Ohio, a corporation of Ohio
Filed Mar. 7, 1960, Ser. No. 13,116
12 Claims. (Cl. 65—25)

The present invention relates generally to the supporting and conveying of sheet material and more particularly of hot glass in sheet or ribbon form.

Although definitely not restricted to use in any specific environment, the invention is especially well adapted to the supporting and conveying of a ribbon of hot glass between its point of formation at the working end of a glass melting furnace and the conventional annealing lehr.

It has been well known in the plate glass art to receive a ribbon of glass, that has been rolled out from the discharge end of a glass tank furnace between a pair of opposed forming rolls, and to convey it toward the annealing lehr by a variety of different means including rolls, slides and even a layer or cushion of compressed air.

However, the supporting and conveying means previously known for this purpose had a decided tendency to produce surface distortion and thickness variations in the glass ribbon being conveyed. In conventional plate glass producing procedure, this is not too important because, in the first place, the ribbon is expected to receive a patterned impression from the forming rolls themselves and, in any event, after the ribbon has been annealed it is normally ground on both sides to flatness and smoothness and then polished to transparency.

Now it is a primary aim of the present invention to provide an improved method and apparatus for receiving a ribbon of glass from a roller forming means and conveying it toward the annealing lehr while supporting the ribbon in such a way and while maintaining the ribbon under such controlled temperature conditions that, where the forming means produces a smooth, flat bottom surface on the ribbon of glass, the quality of the surface will be so well maintained during its passage from the forming means to the annealing area that this surface may be employed for at least certain commercial purposes without the expensive and time consuming mechanical grinding and polishing treatment that was heretofore considered a necessary step in the production of commercial plate glass.

Other objects and advantages of the invention will become more apparent during the course of the following description when taken in connection with the accompanying drawings.

In the drawings, wherein like numerals are employed to designate like parts throughout the same:

FIG. 7 is a fragmentary side elevation of another modification;

FIG. 8 is a transverse sectional view through another form of supporting and temperature controlling apparatus.

Figure 1:
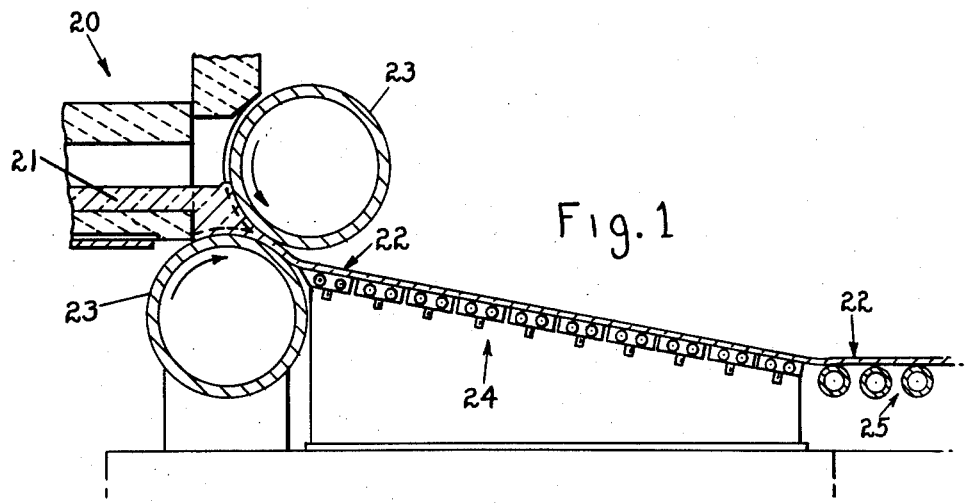
FIG. 1 is a side elevation of a preferred form of the special supporting and temperature controlling apparatus of the invention oriented in relation to a glass furnace and associated forming rolls.

More particularly referring now to the drawings, there is shown in FIG. 1 a melting tank 20 from which molten glass 21 is drawn into a continous ribbon or sheet of glass 22 by means of two counter-rotating forming rolls 23 mounted at the end of the tank. The ribbon or sheet of glass 22, after being formed by the rolls 23, passes over the downwardly inclined supporting and temperature controlling apparatus 24 which supports the ribbon by a thin layer of air or the like. From this apparatus 24 the glass ribbon 22 passes to the mechanical conveying rolls 25 which carry it to the appropriate annealing lehr (not shown) and through further production operations. Normally speaking, the upper surface of the glass supporting and temperature controlling apparatus 24 will have an angle as measured from the horizontal of about 18°.

Figure 2:
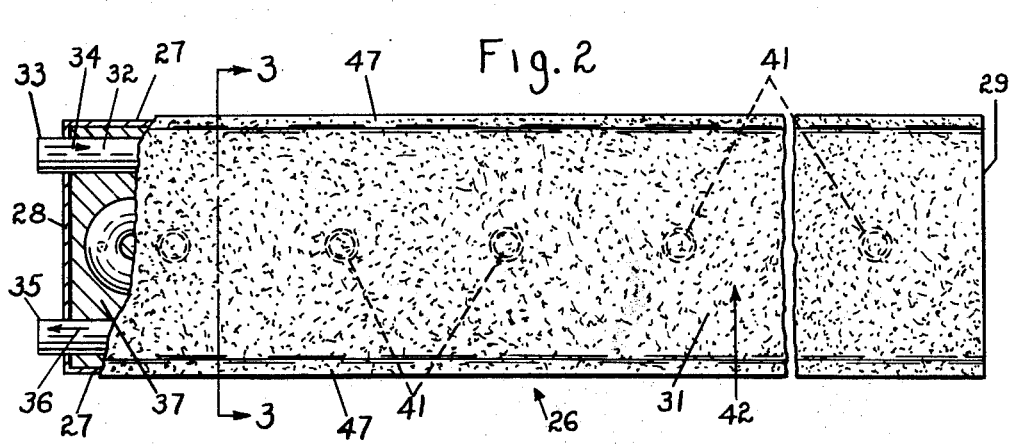
FIG. 2 is a plan view of the apparatus of FIG. 1 taken perpendicular to its inclined upper surface.
Figure 3:
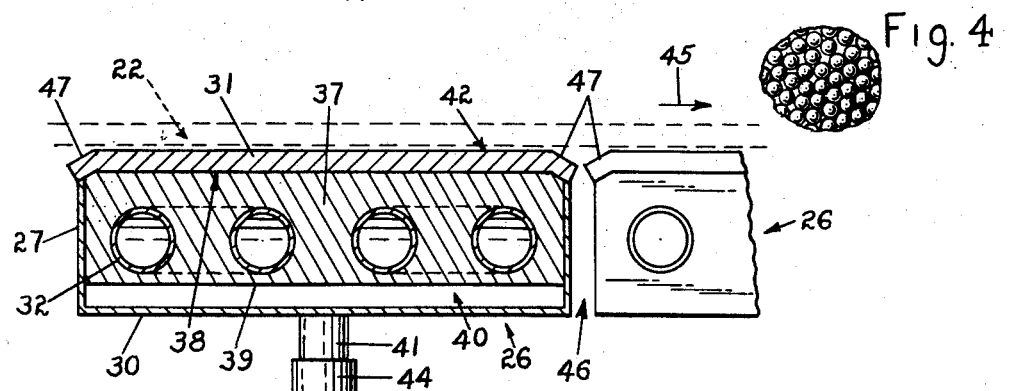
FIG. 3 is a transverse sectional view taken along the lines 3—3 of FIG. 2.

More particularly, as will be seen in FIGS. 2 and 3, the supporting temperature controlling device 24 is composed of a plurality of individual flotation units 26. Each of these units 26 includes a pair of side walls 27, end walls 28, 29 and a bottom wall 30 and a top wall or plate 31. The top wall 31 of these units is formed of a porous material.

A cooling conduit or pipe 32 (FIG. 2) is inserted into the interior of the flotation unit 26, as above described and a cooling medium is circulated therethrough. For example, the cooling medium may be introduced into one end 33 in the direction of arrow 34, pass through the pipe 32 and be ejected through the end 35 of conduits 32 in the direction of arrow 36. Thus by making a U bend in conduit 32 there is provided a continuous recirculation of the cooling medium through the interior of unit 26.

Turning now to FIG. 3 the interior of the flotation unit 26 is filled with a porous material 37 to be later described. This porous material rests against and is flush against the undersurface 38 of the porous top 31 and fills the interior of unit 26 so that the bottom level 39 of material 37 is below the conduit or cooling pipe 32 (FIG. 3). It should here be noted that porous material 37 has a greater porosity than does porous material comprising wall 31 for reasons to be later described. An air space or air manifold 40 is formed between the undersurface 39 of material 37 and the bottom wall 30 of the flotation unit 26. An opening 41 is provided in bottom 30 through which a suitable source of air under pressure may be forced into the unit.

Now it has been found that the volume of air necessary to float the glass ribbon 22 shown in dotted outline (FIG. 3) across the upper surface 42 of porous wall or plate 31 and spaced therefrom is dependent upon the porosity of the plate. For very porous plates 31 a greater volume of air is therefore necessary than that required for a plate having low porosity. Generally speaking, however, highly porous materials are not suitable for flotation of a glass sheet, as herein contemplated, since the large volume of air required for flotation cools the glass rapidly and tends to "balloon" the soft sheet. It is therefore desirable to use the minimum practical amount of air in order to conserve the "body heat" of the glass. This body heat is highly desirable since it aids in the removal from the glass surface of the surface defect known as "sheen," i.e. that surface defect caused by contact between rollers 23 and molten glass.

In the embodiment shown, wall 31 is formed of a porous metallic plate having a mean pore opening of .0002 inch. It has been found that this porosity requires approximately 125 c.f.h./per square foot of air to float a disk of ¼ inch glass having a diameter of one inch. On the other hand a more porous plate (i.e. one having a mean pore opening of approximately .0015 inch) will need an air flow of 550 c.f.h./per square foot to float the same piece of glass. While both of the aforementioned plates having these different characteristics of porosity are satisfactory to float the molten glass sheet across the air trays or unit 26, it has been found desirable to use the one requiring the least amount of air flow for the reasons aforementioned.

The metal plate may have varying thickness, for example, within the range of 1/16 inch to ½ inch. Any thickness within this range would be suitable to float the glass plate so long as sufficient pressure is established to provide a minimum air flow of 125 c.f.h./per square foot. When a ⅛ inch thickness plate having a porosity of .0002 inch is used it has been found that the pressure in manifold 40 should be about 0.15 p.s.i. (4.2 inches W.C.) and that this will provide the necessary air flow. If this thickness is increased to ¼ inch for the same plate (i.e. one having the same mean porosity) the pressure required would be about .30 p.s.i. while if the thickness of the same plate were reduced to 1/16 inch the pressure required would be about .075 p.s.i.

In all cases a filter 44 (FIG. 3) is inserted in the air inlet 41 so as to provide filtered air and to prevent any clogging in the pores of the metallic plate 31.

In this embodiment we desired to use a porous stainless steel plate 31 in order to resist oxidation and also because this porous plate may be welded to walls 27, 28, 29 of the water cooled air flotation unit.

Turning now to the porous material 37 this material performs generally two functions. One function of material 37 is to substantially disperse the air introduced through the inlets 41 so that this air will not directly impinge in a steady stream upon any single point of the undersurface 38 of the metallic plate 31. The second function of this material 37 is to serve as a conductive medium whereby heat will be conducted away from the plate 31, with which it is in physical contact, to the cooling pipes 32. Thus heat will be withdrawn from the tray units 26 through the constant circulation of, for example water or other cooling medium through the conduits 32 as aforementioned.

Figure 4:
FIG. 4 is a fragmentary enlarged view of one form of supporting surface.

One material 37 which has been found to be particularly advantageous in performing both of these functions has been copperplated steel shot approximately ⅛ inch in diameter (see FIG. 4). This shot is braised into position in a reducing atmosphere containing hydrogen at a temperature of approximately 2000°. This temperature is sufficient to melt the copperplating on the shot, which plating is approximately .0003 inch in thickness.

This shot material has been found to be an excellent conductor of heat and also does not offer any resistance to the passage of air therethrough. The tendency of such shot is more to disperse the air passing therethrough from the inlet 41 through the plate 31 to support the glass ribbon than to impede the passage of air. Thus this material 37 acts as a coolant for the porous metal wall 31 and in addition acts as a baffle or dispersant for the air. Also by so dispersing the air, it has been found that the air pressure is more uniform over the entire area of undersurface 38 of wall 31. As seen in FIG. 2, air is forced into the manifold 40 through a series of spaced inlets 41 across the width of the tray between the end walls 28, 29 and this further assists in providing uniform distribution of air pressure on the wall 31.

Therefore, air introduced through inlets 41 in the direction of arrow 43, passes through the filter 44 to have impurities removed therefrom, passes through the air space 40, through the porous material 37, through the porous plate 31, and forms a film of air to support the glass ribbon 22. Thus the ribbon 22, passing in the direction of arrow 45 is actually supported on an air cushion and out of physical contact with the upper surface 42 of the plate 31.

It should be here noted that the top surface 42 of all the adjacent units 26 are co-planar, however, as aforementioned the general plane of all these surfaces 42 is slightly downwardly inclined with respect to the horizontal in the direction of glass flow.

In addition, adjacent units 26 are slightly spaced from one another as shown by clearance space 46 (FIG. 3). This is of great importance since by establishing space 46, the air passing, as aforementioned from the inlet 41 through the plate 31, will have an escape route and will not build up underneath the glass sheet to a sufficient pressure to cause ballooning of the sheet. Proper control of air pressure to achieve the desired air flotation pressures will insure just enough lifting action on the glass ribbon 22 to float the glass ribbon across the tray unit 26 without ballooning of the glass sheet.

Figure 5:
FIG. 5 is a view similar to FIG. 4 but of a modified form of supporting surface.

In FIG. 5 there is shown a modification of the steel shot aforediscussed and illustrated in FIG. 4. This shot in FIG. 5 is also ⅛ inch copperplated shot, however, it is best described as split shot. This split shot is braised together in much the same manner as is the steel shot, spherical in form, shown in FIG. 4. Under certain conditions it has been found desirable to use the split shot as porous material 37 to conduct and diffuse the air as aforediscussed instead of the steel shot shown in FIG. 4.

Turning again to FIGS. 2 and 3, the opposite marginal edges 47 of the metal plate 31, transverse to the flow direction of the glass, are downwardly inclined with respect to the substantially horizontal plane of the major area of surface 42 and towards clearance space 46. Thus, the top wall 31 is welded to the side walls 27 at a point depressed below the general plane of undersurface 38 of plate 31. This serves to remove the weld from a position close to the molten glass and also insures passage of air through the porous plate to contact all portions of the glass ribbon floating across a plate 31 of a unit 26 unimpeded by the weld joint between walls 27 and wall 31.

Figure 6:
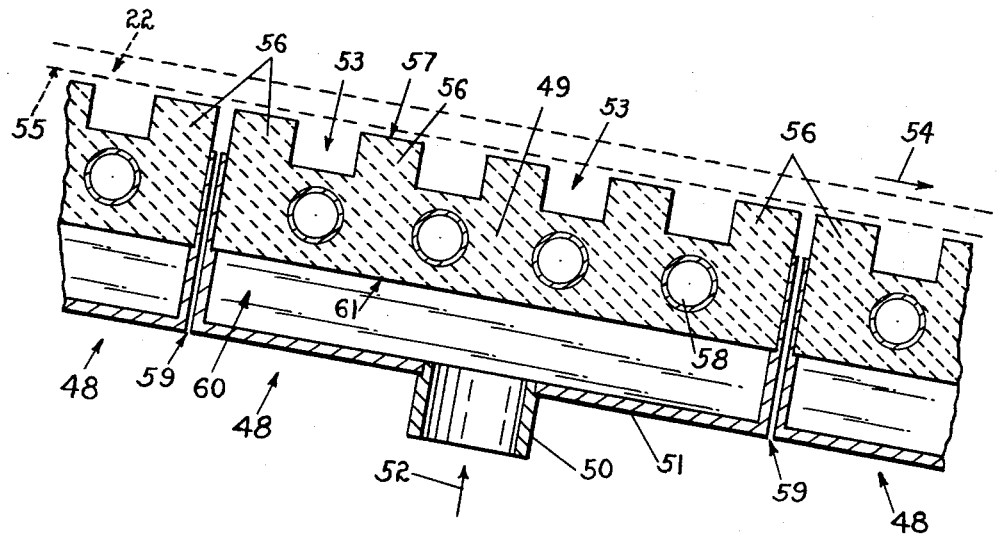
FIG. 6 is a fragmentary longitudinal sectional view through a modified form of the supporting and temperature controlling apparatus shown in FIG. 1.

Turning now to FIG. 6 there is shown a modification of the tray units 26 of FIGS. 2 and 3. These units 48 are most particularly characterized by the fact that the dual porous materials of FIGS. 2 and 3 (i.e. metal plate 31 and the porous material 37) has been replaced by a single porous refractory material 49. This porous refractory material has a porosity which is greater than that associated with the porous metal.

In the modification of FIG. 6, a combustible gas is inserted through the inlet 50 in the bottom wall 51 of unit 48 in the direction of arrow 52. Combustion slots or spaces 53 have been provided in the top surface of the refractory material 49 and these spaces run substantially transversely to the direction of the glass 22, shown in dotted outline, moving in the direction of arrow 54. The gaseous mixture passing through the porous material 49 and lying in the combustion spaces 53 is ignited and will flame polish the undersurface 55 of the glass ribbon 22 moving across the units 48. However, the raised portions 56 of this refractory material 49 between slots 51 are positioned so close to the undersurface 55 of the ribbon 22, that combustion of the gas between the surfaces 57 of these projections 56 and the undersurface 55 of the ribbon 22, is not possible due to a lack of oxygen. Therefore glass ribbon 22 passing across the unit shown in FIG. 6 will, within each unit 48, be supported at a plurality of spaced points upon a film of a gaseous material and in the areas between the spaced support points will be fire polished through the flames resulting from the ignition of the combustible gas.

In this modification there is a cooling system 58, similar to the system 32 hereinbefore described, and the units 48 are also spaced as at 59 for generally the same reasons as aforediscussed with regard to the clearance spacings 46 between units 26 at FIGS. 2 and 3. In this regard it is noted that the refractory material extends below the water cooling system 58 and defines a manifold space 60 between the undersurface 61 of this porous material 49 and the bottom wall 51 of the unit 48.

Turning now to FIG. 7 there is shown another modification of the trays 26 of FIGS. 2 and 3. In this instance, however, the trays 26 have been spaced apart a greater distance than that shown in FIG. 3 so that a clearance space 62 is created between adjacent units. Into this space 62 is inserted a burner unit 63 to directly impinge a flame 64 onto the undersurface 65 of a glass ribbon 22 flowing across the inclined plane, determined by the upper surface 42 of the top wall 31 of each respective unit 26, in the direction of arrow 66. Thus there is a combination here of the air flotation principles which have been explained in the heretofore detailed description of FIGS. 2 and 3 with a flame polishing of the glass ribbon bottom surface, to achieve more uniform smoothness and flatness, through the burner units 63.

Turning now to FIG. 8 there is shown a further modification of the invention wherein the glass ribbon 22 shown in dotted outline is floated across the upper surface 67 of a porous metal plate 68 on a cushion of steam. A steam flotation unit 69 including end walls 70, 71, bottom wall 72 and one of a pair of side walls 73 is provided wherein the interior 74 is maintained full of water. Water passes into interior 74 through conduit 75 in end wall 70 in the direction of arrow 76 and is drained from interior 74 as desired through a conduit 77, having a valve 78, in side wall 71. In this modification, water passing into the unit interior 74 is raised to the boiling point by heat conducted through the metal plate 68 from the glass 22 passing across surface 67 thereof. Thus steam escapes through the porous material 68 to maintain a steam cushion between the ribbon 22 and the plate 68 and the cushion will support the plate out of physical contact with the plate 68.

Figure 9:
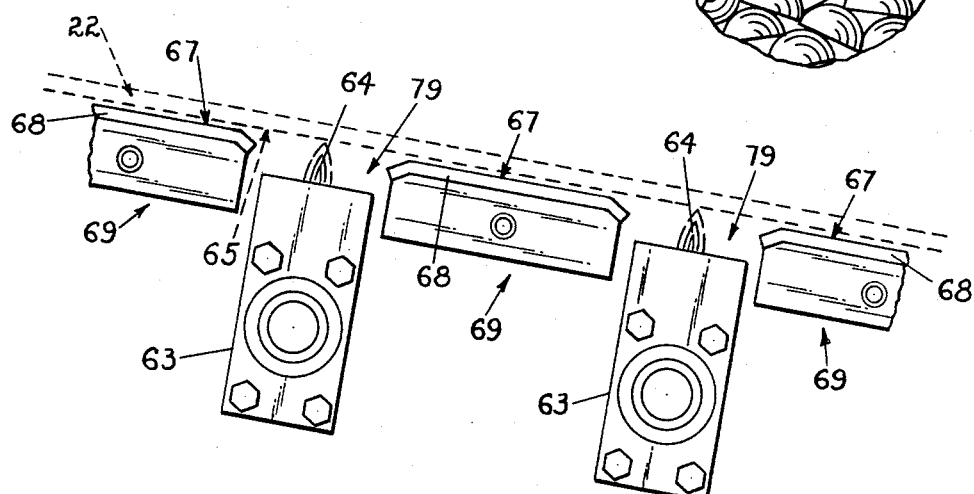
FIG. 9 is a fragmentary side elevation of the apparatus shown in FIG. 8.

Turning now to FIG. 9 there is shown a modification of the invention described in FIG. 8. Steam flotation units 69 are spaced one from another by clearance space 79 this space being substantially the same as the clearance space 62 aforediscussed with regard to the modification in FIG. 7. Burner units 63, as aforediscussed with regards to FIG. 7, are used to impinge a flame 64 directly upon the undersurface 65 of a glass ribbon 22 flowing across the top surface 67 of each porous plate 68 of each unit 69. Thus, the glass is supported out of physical contact with the supporting unit 69 through the use of a steam flotation and at a plurality of spaced areas or points, between these areas of steam flotation, the glass is flame polished by the direct impingement of an ignited gaseous flame.

Therefore there has been provided in the modification of FIGS. 7 and 9, a plurality of successive zones where each zone extends transversely of the glass ribbon. The glass is floated on a cushion of air or steam in every other one of these zones (by the air or steam flotation units of FIGS. 3 or 8) and flame treated in the zones therebetween. Therefore as seen in FIGS. 7 and 9 the zones of air or steam flotation and flame treatment alternate along the path of the glass. The ribbon of glass is thus supported by a film of a gas and this flotation film is pierced at spaced points by the direct impingement of flames emitted through the burner units 63. This same general characteristic alternating gas support and flame treatment is also found in the modification of FIG. 6 where the flame treatment is achieved by igniting the gas in spaces 53 between upraised portions 56.

Generally, this flame treatment establishes a temperature differential in the gaseous layer contacting the undersurface of the glass in adjacent zones. In any case, the gas, when ignited, impinges a flame heat directly upon the undersurface of the glass ribbon and will flame polish the undersurface of the glass sheet. Additionally, the gas may be ejected in any desired embodiment under a sufficient presure that it also will tend to buoy up or lift up the sheet as it passes through the space between successive units.

The number of these zones of alternate heat treatment and their individual length, as well as the total of all the lengths constituting the apparatus 24 (FIG. 1) is closely controlled. Generally speaking, the glass should exit off the supporting device 24 (FIG. 1) at about 1100° F. so that the bottom sheet surface will be fire polished but still the sheet shall be rigid by the time it arrives on mechanical rollers 25 so that these rollers will not mar the contacted glass surface.

Thus, there has been provided a method and apparatus for supporting and controlling the temperature of a glass sheet as it passes through the critical zone between the forming rolls and the lehr rolls in order to provide a substantially smooth, flat and distortion free bottom sheet surface. Such a surface is particularly characterized by smoothness and flatness so that the sheet will not require extensive grinding and polishing, normally associated with plate glass, and will have a rigidity sufficient to allow physical contact with the lehr rolls without such contact marring the sheet surface contacted.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

We claim:

1. In a method of supporting sheet glass on a relatively frictionless cushion and simultaneously controlling the temperature of said sheet glass, the steps of passing the sheet across a porous mass, removing heat from said porous mass by a confined fluid in contact therewith, and introducing an aeroform fluid into the porous mass under pressure so as to cause said fluid to pass through the porous mass and form a cushion between said mass and the sheet.

2. A method of supporting sheet glass on a relatively frictionless cushion as claimed in claim 1, including the step of piercing said cushion at a plurality of points spaced along the path of the sheet with a flame impinging directly onto the undersurface of the ribbon.

3. A method of supporting sheet glass on a relatively frictionless cushion as claimed in claim 1, wherein said confined fluid is water located below said porous mass, including the step of raising the temperature of the water above its boiling point by heat conducted thereto from the glass sheet whereby steam is forced through said porous mass to form said cushion.

4. A method of supporting sheet glass on a relatively frictionless cushion as claimed in claim 1, wherein the porous mass is divided into a plurality of spaced individual sections along the path of movement of the sheet, and including directing a flame against the undersurface of the ribbon in the spaces between said sections to fire polish the undersurface of said ribbon.

5. An apparatus for supporting sheet glass on a relatively frictionless cushion and simultaneously controlling the temperature of said sheet glass, including a flotation unit disposed beneath the sheet along its path of movement, said flotation unit comprising a porous mass, passage means in contact with the porous mass confining fluid for cooling said mass, and other means for introducing an aeroform fluid into said mass under pressure whereby said fluid passes through said porous mass to form a cushion between the mass and the sheet.

6. Apparatus for supporting sheet glass on a relatively frictionless cushion as claimed in claim 5, including a second layer of porous material interposed between said porous mass and the glass sheet, said second layer having a different porosity than said porous mass.

7. Apparatus for supporting sheet glass on a relatively frictionless cushion as claimed in claim 5, including a plurality of said individual flotation units disposed beneath the sheet along its path of movement, said individual flotation units being spaced from one another, and flame producing means inserted into the spaces between said units to direct flames against the undersurface of the sheet for fire polishing said undersurface.

8. Apparatus for supporting sheet glass on a relatively frictionless cushion as claimed in claim 5, including a plurality of said individual flotation units disposed beneath the sheet along its path of movement, said individual units being slightly spaced from one another to provide an escape passage for the fluid forming the flotation cushion in order to prevent ballooning of the ribbon.

9. Apparatus for supporting sheet glass on a relatively frictionless cushion as claimed in claim 5, wherein the surface of said porous mass includes a plurality of transversely extending slots, and said aeroform fluid is a combustible gas whereby a portion of said combustible gas enters into said slots and is ignited to establish a fire flotation line transverse to the glass in each of said slots.

10. Apparatus for supporting sheet glass on a relatively frictionless cushion as claimed in claim 6, wherein the porosity of said second layer of porous material is less than that of said porous mass.

11. Apparatus for supporting sheet glass on a relatively frictionless cushion as claimed in claim 6, wherein said second layer of porous material is formed of 1/8" diameter copper plated shot.

12. Apparatus for supporting sheet glass on a relatively frictionless cushion as claimed in claim 6, wherein said second layer of porous material is formed of split 1/8" diameter copper plated shot.

References Cited in the file of this patent

UNITED STATES PATENTS

| | | |
|---|---|---|
| 1,532,134 | Gelstharp | Apr. 7, 1925 |
| 1,827,138 | Brancart | Oct. 13, 1931 |
| 2,444,731 | Devol | July 6, 1948 |
| 2,717,474 | Smith | Sept. 13, 1955 |
| 2,826,868 | Wynne et al. | Mar. 18, 1958 |
| 2,878,621 | Zellers et al. | Mar. 24, 1959 |